United States Patent
Kane et al.

(10) Patent No.: US 6,753,931 B2
(45) Date of Patent: Jun. 22, 2004

(54) PULSE SEQUENCING FOR GENERATING A COLOR IMAGE IN LASER-BASED DISPLAY SYSTEMS

(75) Inventors: Thomas J. Kane, Menlo Park, CA (US); Jeffrey D. Kmetec, Palo Alto, CA (US)

(73) Assignee: Lightwave Electronics, Mountain View, CA (US)

( * ) Notice: Subject to any disclaimer, the term of this patent is extended or adjusted under 35 U.S.C. 154(b) by 446 days.

(21) Appl. No.: 09/927,596

(22) Filed: Aug. 10, 2001

(65) Prior Publication Data

US 2003/0030756 A1 Feb. 13, 2003

(51) Int. Cl.$^7$ .............................. H04N 9/12; H04N 5/74
(52) U.S. Cl. ........................ 348/742; 348/750; 348/757
(58) Field of Search ................................. 348/742, 743, 348/750, 756, 757, 778, 779, 780, 744, 196; 372/22, 10, 25, 39; 359/264, 22; 353/43, 98; H04N 9/12, 9/31, 5/74, 9/10

(56) References Cited

U.S. PATENT DOCUMENTS

| | | | |
|---|---|---|---|
| 3,639,684 A | * 2/1972 | Levine | 348/744 |
| 4,110,788 A | * 8/1978 | Merry | 348/760 |
| 5,317,348 A | * 5/1994 | Knize | 348/750 |
| 5,534,950 A | 7/1996 | Hargis et al. | 348/758 |
| 5,614,961 A | 3/1997 | Gibeau et al. | 348/750 |
| 5,700,076 A | 12/1997 | Minich et al. | 353/31 |
| 5,715,021 A | * 2/1998 | Gibeau et al. | 348/750 |
| 5,740,190 A | 4/1998 | Moulton | 372/23 |
| 5,828,424 A | 10/1998 | Wallenstein | 348/760 |
| 5,920,361 A | 7/1999 | Gibeau et al. | 348/750 |
| 6,233,025 B1 | 5/2001 | Wallenstein | 348/750 |
| 6,256,073 B1 | * 7/2001 | Pettitt | 348/743 |
| 6,483,556 B1 | * 11/2002 | Karakawa et al. | 348/750 |
| 6,636,275 B1 | * 10/2003 | Wilson | 348/750 |

* cited by examiner

Primary Examiner—Sherrie Hsia
(74) Attorney, Agent, or Firm—Lumen Intellectual Property Services

(57) ABSTRACT

A system and method for using pulses of laser light delivered in a non-overlapping sequence of first pulses at a green wavelength, second pulses at a blue wavelength and semi-continuous pulses at a red wavelength to illuminate a color generation unit for generating a color. Typically, the color generating unit is an image generating unit for producing color images and is equipped with transmissive or reflective pixels which are adjusted to select portions of the laser light generated at the green, blue and red wavelengths to obtain a desired output color. The first and second pulses preferably have a narrow pulse width and an interpulse separation equal to at least 100 times the narrow pulse width, while the semi-continuous pulses at the red wavelength have a wide pulse width equal to at least 100 times the narrow pulse width.

21 Claims, 5 Drawing Sheets

PULSE SEQUENCING FOR GENERATING A COLOR IMAGE IN LASER-BASED DISPLAY SYSTEMS

RELATED APPLICATIONS

This application is related to application Ser. No. 09/927,145, entitled "Compound Light Source Employing Passive Q-switching and Nonlinear Frequency Conversion" and application Ser. No. 09/927,191, entitled "Solid State Laser Generating UV Radiation for Writing Bragg Gratings", both of which are filed on the same day as this application.

FIELD OF THE INVENTION

The present invention relates to generating color images from pulsed light sources, and in particular it relates to the sequencing of pulses for generating color images in laser-based image display systems.

BACKGROUND OF THE INVENTION

In modern society information is frequently communicated to an audience by displaying it on a display device. For example, images and text are often shared by displaying them on a monitor such as a cathode ray tube (CRT) or projecting them on a projection screen. More recently, passive and active matrix display systems with flat screens have been widely employed for the same purposes. CRT technology is well-understood and CRTs are used extensively in displaying color images. Unfortunately, CRTs are limited in their ability to display large and detailed images. At close viewing distances pixel size and resolution place a bound on the achievable image contrast and detail. In addition, CRTs generate low frequency electromagnetic fields and X-rays, which are dangerous to viewers located close to the CRT unit. Thus, CRT technology remains confined to devices such as televisions, as these are viewed by users from larger distances.

Matrix displays are typically back-lit by a single incandescent white light source to generate the primary colors—red, green and blue (RGB)—that illuminate a liquid crystal display (LCD) panel. In an active display, the LCD panel has RGB pixels which are independently modulated by the LCD selection matrices that also generate the mastering. Although these projectors have fair resolution, there are other unavoidable problems related to this scheme. The incandescent white light source has a relatively short operating life and generates relatively large amounts of heat. The LCD devices cannot be manufactured without some minimum number of defects that, in turn, manifest themselves as permanent image artifacts on the screen regardless of the graphic or video source. Using LCD devices to generate the raster introduces a fixed and permanent resolution to the display device, making it very difficult to adapt the electronics to accept other resolutions for display of graphics and text information. Furthermore, the light intensity levels of LCD displays are low, rendering them generally unsuitable for viewing under adverse lighting conditions, e.g., outdoors.

Brighter video projectors have been constructed using lasers. Typically, the green and blue beams are generated by argon ion gas lasers that directly emit green and blue light and the red beam is usually generated by a liquid dye laser (pumped with part of the high power blue and green lasers). Laser-based display systems produce brighter images than non-laser based systems, they can achieve close to 100% color saturation, and they also exhibit pixel size stability. Unfortunately, such laser-based display systems have low light generation efficiencies and generate a high amount of waste heat. In addition, the lasers are large, the scanning systems are cumbersome and the resulting devices are too expensive for most common applications.

Several laser display systems have been proposed to address the above-mentioned limitations. U.S. Pat. No. 5,740,190 to Moulton teaches a three-color coherent light system adapted for image display purposes. This system employs a laser source and a frequency doubling crystal to generate green light at 523.5 nm. Moulton's system also generates blue light at 455 nm and red light at 618 nm by relying on frequency doubling and the nonlinear process of optical parametric oscillation. U.S. Pat. No. 5,534,950 to Hargis et al. describes using a microlaser and/or diode laser array for producing an image to be projected. The system includes three linear laser arrays, one red, one green and one blue, each individually addressable laser being powered and modulated in accordance with the input image signal. The image is produced line-by-line with the aid of a scanning mirror. In order to reduce the number of lasers required, a color laser display system described in U.S. Pat. No. 5,828,424 to Wallenstein et al. and in U.S. Pat. No. 6,233,025 B1 to Wallenstein employs nonlinear frequency conversion of light from a single pulsed laser source to produce the three fundamental colors necessary for operating the display.

U.S. Pat. Nos. 5,614,961 and 5,920,361 to Gibeau et al. also discuss methods and apparatus for image projection using the primary colors produced by laser arrays. They teach three linear laser arrays to generate a number of beamlets of the three fundamental colors. Each of the beamlets is individually modulated in luminance according to a specific encoding scheme representing the video image to be produced on the viewing screen. In some cases the fundamental colors are derived from lasers operating at twice the desired wavelength with the aid of nonlinear frequency conversion processes such as second harmonic generation (SHG).

Gibeau et al. recognize that the intensity of the beams can be adjusted by pulse width modulation (PWM). This technique involves varying the number of pulses (duty cycle) during each pixel time such that the average power delivered to any diode over the pixel time will correspond to light from the diode at specific intensity. For example, for maximum intensity the pulse is kept on during the entire duration of the pixel time. For ½ intensity the beam contains a number of pulses whose total duration adds up to ½ of the pixel time. In fact, Gibeau et al. teach that various amplitudes and duty cycles can be used to obtain the desired average power during each pixel time.

Minich et al. also recognize that proper pulsing of lasers in displays is important. In U.S. Pat. No. 5,700,076 they teach a projection light source which has a red laser for producing red high intensity light, a green laser for producing a green high intensity light and a blue laser for producing blue high intensity light. Each of the lasers is switched between ON and OFF states, and in this way the lasers are made to generate sequential mono-colored pulses of light. A single light valve is used to combine the three colors and filter them to produce the image for projection. Each mono-colored pulse is generated at its maximum luminosity level. To increase operation efficiency, each one of the lasers is controlled individually and sequentially by a computer to cause them to be deactivated at a near ON output luminosity for a short OFF period. The lasers are pulsed ON and OFF during the same frame time of the projection system such that each one is preferably on for one third of a frame interval. This means the average power consumed by the lasers is only approximately one-third of the peak power. Minich et al. also teaches that the lasers can be pulsed on for shorter periods of time.

Unfortunately, the prior art does not provide for efficient, low-cost and high power laser display systems using pulsed or continuous-wave (cw) RGB light and sharing light modulators (i.e., no separate modulators assigned to controlling red, green and blue light). Specifically, in systems using three cw lasers for producing RGB light each of the sources has to be off for about ⅔ of the time for performing time-multiplexing with one light modulator. This means that the lasers have to be driven at three times higher output power to generate the same color brightness as they produce when on all the time. The cost of a cw laser usually scales with its peak power, so using three cw lasers each of which has triple the power required is unattractive. Especially red cw diode lasers are expensive and have limited power. Thus, it would be advantageous to operate RGB display systems using red cw diode lasers in a time-multiplexing mode where the red cw diode laser is on for more than ⅓ of the time. This type of time-multiplexing would reduce the peak power requirements for the red cw diode laser. None of the above systems can be used to generate appropriately pulsed and sequenced RGB light or pulsed and cw light with average output power levels in excess of 1 Watt in each of the primary colors to drive a color image display with time-multiplexed light modulators.

OBJECTS AND ADVANTAGES

It is therefore a primary object of the present invention to provide a method of pulse sequencing in laser-based display systems for generating a color image in a time-multiplexed display system.

It is a further object of the invention to ensure that the pulse sequencing method is suitable for use with laser sources employing non-linear frequency conversion to generate light in the blue and green ranges at average power levels in excess of 1 Watt.

It is another object of the invention to adapt the pulse sequencing method to display systems such as scanned linear projection displays.

These and other objects and advantages of the invention will become apparent upon further reading of the specification.

SUMMARY

The objects and advantages are achieved by a display system and method of sequencing pulses of laser light for generating a color. The color generated according to the invention can be used simply for color generation or for specific applications such as color image generation. The method calls for providing first pulses at a green wavelength, second pulses at a blue wavelength and semi-continuous pulses at a red wavelength. Next, a non-overlapping sequence of the first, second and semi-continuous pulses is produced and used to illuminate a color generating unit such as an image generating unit. The image generating unit is adjusted to select a portion of the laser light generated at the green, blue and red wavelengths. Specifically, it is set to select a portion of at least one of the green, blue and red wavelengths to obtain laser light having a desired output color.

Preferably, the image generating unit is a pixel. In one embodiment the pixel is a reflective pixel and the step of adjusting the image generating unit involves setting a reflective property of the pixel such that it reflects the appropriate portion(s) of the laser light at the green, blue and red wavelengths. In another embodiment the pixel is transmissive and the step of adjusting the image generating unit involves setting a transmissive property of the pixel to obtain the desired output color.

The non-overlapping sequence of pulses at the three wavelengths corresponding to the fundamental colors preferably contains recovery periods between the first, second and semi-continuous pulses. The recovery periods conveniently correspond to an adjustment recovery time of the pixel, which is the time required to change the setting of the reflective or transmissive properties of the pixel. In fact, this time may even be longer than the time required to change the setting, depending on the types of pixels used. In one particular embodiment the pixels are grating-type light valves and the recovery periods correspond to the time required to adjust the grating strips of the light valve.

The first and second pulses preferably have a narrow pulse width and an interpulse separation equal to at least 100 times the narrow pulse width. The semi-continuous pulses at the red wavelength have a wide pulse width equal to at least 100 times the narrow pulse width. Furthermore, the first, second and semi-continuous pulses have essentially equal time-averaged power. In other words, the total energy in first, second and semi-continuous pulses during one cycle or refresh period is equal. Alternatively, the pulses have balanced average powers such that their mixture produces white light.

The non-overlapping sequence of pulses can comprise sets of pulses. For example, a set of first pulses can be followed by a set of second pulses and one semi-continuous pulse in each cycle. For example, in one embodiment the duration of the cycle corresponds to a refresh rate of the image generating unit. In a preferred embodiment, the method of invention is employed in a scanning display system. In this case adaptations are made to coordinate the scanning with the non-overlapping sequence of pulses and the refresh rate.

A display system according to the invention has a first source of first pulses at the green wavelength, a second source of second pulses at the blue wavelength and a third source of semi-continuous pulses at the red wavelength. A coordinating unit produces the non-overlapping sequence of the first, second and semi-continuous pulses and an image generation unit is illuminated with the non-overlapping sequence. The display system has a control unit for adjusting the image generating unit to select a portion of the light at at least one of the three wavelengths.

In a preferred embodiment the first and/or the second source are compound. Specifically, the source has a passively Q-switched laser for generating primary pulses, an amplifying fiber for receiving the primary pulses and amplifying them to generate high-power intermediate pulses, and a nonlinear element for receiving the intermediate pulses and generating the first and/or second pulses. Meanwhile, at least one of the first, second and third sources can be a diode laser. For example, the red wavelength is conveniently generated by a diode laser.

The image generation unit preferably uses pixels for generating the image. In fact, it is preferable that the pixels be grating-type light valves.

As will be apparent to a person skilled in the art, the invention admits of a large number of embodiments and versions. The below detailed description and drawings serve to further elucidate the invention and its operation.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1:
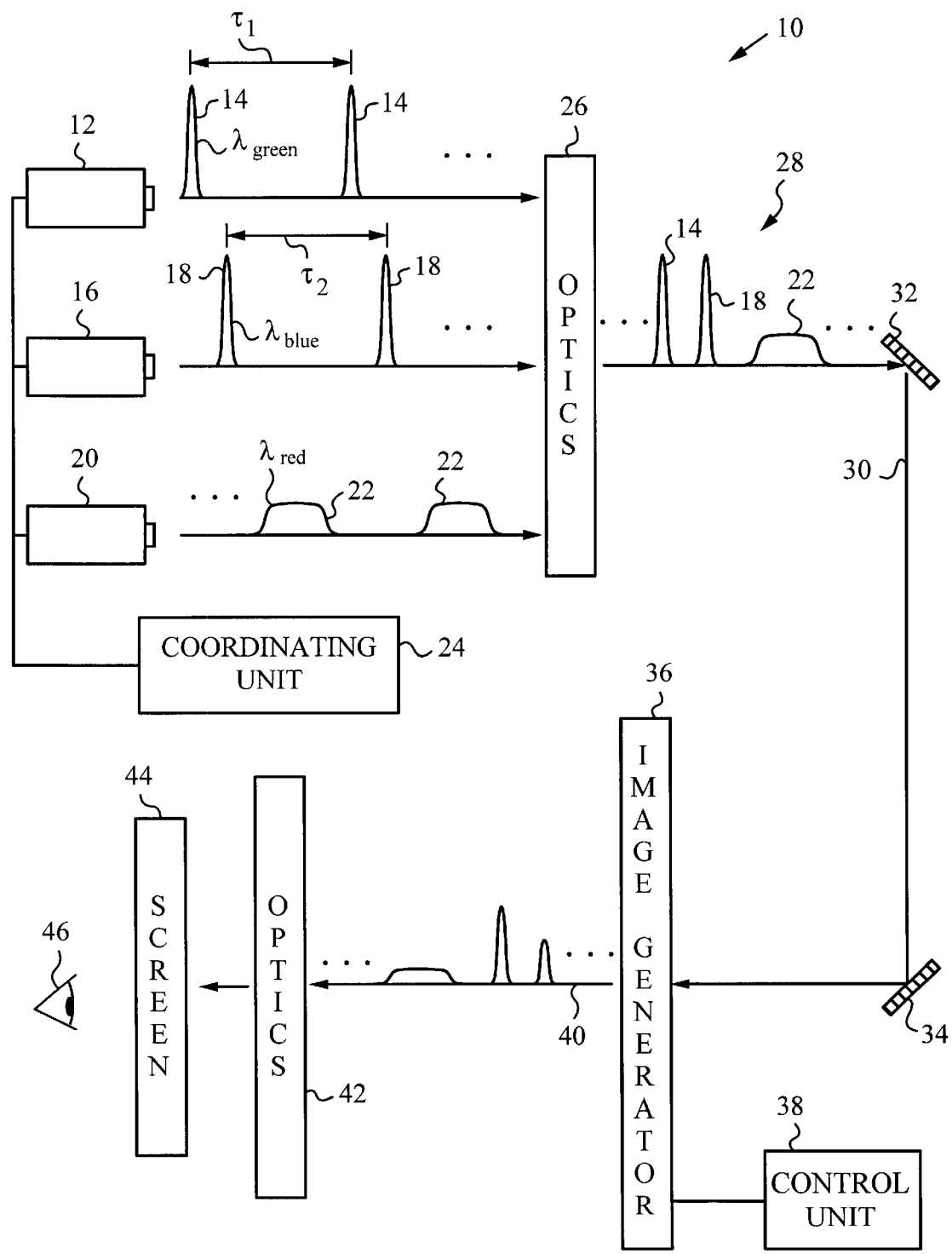
FIG. 1 is a block diagram illustrating the general principles of an image projection display using non-overlapping sequence of pulses according to the invention.

FIG. 1 is a block diagram of an exemplary display system 10 according to the invention. Display system 10 has a first source 12 for generating first pulses 14 at a green wavelength $\lambda_{green}$ and a second source 16 for generating second pulses 18 at a blue wavelength $\lambda_{blue}$. First source 12 and second source 16 are laser-based sources with appropriate modulation control, e.g., Q-switching, to produce laser light in first pulses 14 and second pulses 18. Any suitable wavelength within the green range can be selected as green wavelength $\lambda_{green}$ for first pulses 14. Similarly, any suitable wavelength within the blue range case be selected as blue wavelength $\lambda_{blue}$ for second pulses 18. For example, $\lambda_{green}$ is selected between 515 and 540 nm and $\lambda_{blue}$ is selected between 440 nm to 470 nm.

For display purposes, pulses 14 and 18 exhibit high peak powers, e.g., in excess of 5,000 Watts and even up to 10,000 Watts, and their duty cycles are selected such that the average power at the green and at the blue wavelengths is about 1 Watt or more. To achieve such average power the duty cycles of pulses 14 and 18 are set between 0.1% and 0.01%. Thus, pulses 14 and 18 have interpulse separations $\tau_1$ and $\tau_2$ which are preferably at least 100 times longer and preferably up to 10,000 times longer than the durations of pulses 14, 18. Sources 12, 16 can include nonlinear frequency conversion elements and other suitable elements such as amplifiers to produce pulses 14, 18 in accordance with the above pulse format.

Display system 10 is further equipped with a third source 20 for producing a semi-continuous wave (semi-cw) output in the form of semi-continuous pulses 22 at a red wavelength $\lambda_{red}$. Source 20 is preferably a laser-based source such as a diode laser. As in the case of sources 12 and 16, source 20 can employ suitable nonlinear frequency conversion elements, amplifiers and other elements to generate semi-continuous pulses 22. Red wavelength, $\lambda_{red}$ is selected at any suitable wavelength within the red wavelength range, e.g., between 620 and 660 nm.

A coordinating unit 24 is connected to sources 12, 16 and 20 to coordinate their operation. Specifically, coordinating unit 24 staggers the emission of pulses 14, 18 and semi-continuous pulses 22 such that they are emitted in a non-overlapping sequence. Optics 26 are provided for combining pulses 14, 18 and semi-continuous pulses 22 into one pulse train 28 in a beam 30. Optics 26 include the required element or elements, e.g., lenses, mirrors, beam splitters, etc. for combining pulses 14, 18 and 22 into pulse train 28 in beam 30. Optics 26 is also designed to perform its combining function in such a manner that the non-overlapping sequence of pulses 14, 18 and 22 is preserved in combined pulse train 28. A person of average skill in the art will be able to select the appropriate optics 26 to fulfill these requirements.

Two beam guiding elements 32, 34 positioned in the path of beam 30 serve to guide beam 30 to an image generation unit 36. Unit 36 can be any suitable mechanism for generating color images from green, blue and red wavelengths contained in the non-overlapping sequence of pulses 14, 18, 22 carried by beam 30. For example, unit 36 has a number of imaging elements or pixels which individually select appropriate portions of the laser light at green, blue and red wavelengths from beam 30 to create a desired color.

Elements 32, 34 include any suitable optical elements, e.g., deflecting mirrors and lenses for illuminating all pixels of unit 36 with the non-overlapping sequence of pulses 14, 18, 22. A person skilled in the art will recognize that in the event of a large unit 36 elements 32, 34 can include scanning devices and that any suitable scanning technique can be employed by elements 32, 34 in scanning beam 30 over unit 36. In the embodiment shown, unit 36 is not scanned by beam 30 and elements 32, 34 include deflecting mirrors and lenses to guide, expand and collimate beam 30 such that it illuminates all pixels of unit 36 simultaneously. For purposes of clarity, the block representation in FIG. 1 shows unit 36 acting as a single imaging element or pixel.

A control unit 38 is connected to unit 36 to adjust the settings of the imaging elements or pixels. Unit 36 produces a projection beam 40 containing the image to be displayed. Projection optics 42 are positioned in the path of projection beam 40. Optics 42 contain any suitable element or elements, e.g., lenses and, in the case the image is scanned appropriate scanners, for projecting the image generated by unit 36 on a screen 44 for viewing by a viewer 46.

During operation, sources 12, 16, 20 produce light at the red, green and blue (RGB) wavelengths. The light is emitted from sources 12, 16, 20 in the form of non-overlapping sequence of pulses 14, 18, 22. The timing of pulses 12, 16, 20 with respect to each other is determined by coordinating unit 24. Also, the power levels and duty cycles of pulses 12, 16, 20 are adjusted within the pulse format discussed above such that at least 1 Watt of average power is delivered at each of the RGB wavelengths.

After being combined into one beam 30 by optics 26, the non-overlapping sequence of pulses 14, 18, 22 is steered by elements 32, 34 to unit 36. Unit 36 is adjusted by control unit 38 to select a portion of the light of beam 30 at at least one of the RGB wavelengths. A person skilled in the art will recognize that by selecting appropriate portions of the RGB wavelengths in beam 30, illuminating unit 36 can generate any color needed for display purposes. In the case shown in FIG. 1, unit 36 is adjusted by control unit 38 to select portions of all three RGB wavelengths to produce the desired color in projection beam 40. In a final step, projection beam 40 is shaped by optics 42 and projected on screen 44 to viewer 46.

Display system 10 can be used for projecting any type of image on screen 44. In order for viewer 46 to observe a steady image, coordinating unit 24 ensures that non-overlapping sequence of pulses 14, 18, 22 is delivered at a high repetition rate, e.g., in excess of 100 kHz and that the pixels of unit 36 are refreshed at an appropriately high refresh rate, preferably in coordination with the pulse repetition rate (e.g., such that an equal number of pulses is apportioned to each refresh period). Furthermore, in case elements 32, 34 and/or optics 42 include a scanning device, the scanning rate is set appropriately high such that the entire image is refreshed at a sufficiently high rate, e.g., in excess of 60 Hz.

Figure 2:
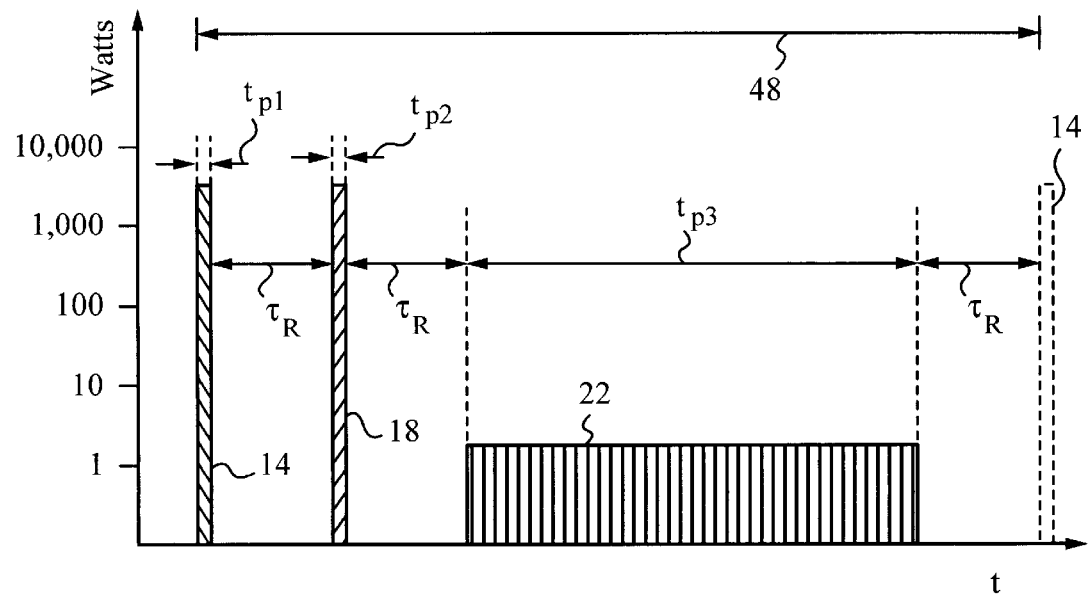
FIG. 2 is a diagram illustrating pulse power levels and timing.

FIG. 2 illustrates in more detail one cycle 48 of the non-overlapping sequence of pulses 14, 18, 22 exhibiting a preferred pulse format. First pulse 14 and second pulse 18 have equal peak powers both in the 5,000 to 10,000 Watt range. Pulses 14, 18 have narrow pulse widths $t_{p1}$ and $t_{p2}$ on the order of nanoseconds. Semi-continuous pulse 22 has a peak power in the 2 to 3 Watt range and a wide pulse width, preferably at least 100 times longer than narrow pulse width $t_{p1}$ or $t_{p2}$. The interpulse separation between successive pulses 14 (in this case successive pulse 14 is contained in the next cycle) is equal to at least 100 times narrow pulse width $t_{p1}$. Successive pulses 18 also have that same pulse separation.

In this preferred pulse format first second and semi-continuous pulses 14, 18, 22 have essentially equal time-averaged power. In other words, the total energy delivered in first, second and semi-continuous pulses during cycle 48 is equal. Alternatively, the peak powers of pulses 14, 18, 22 can be adjusted or balanced with reference to viewer 46 such that beam 30 is perceived by viewer 46 to contain white light.

Pulses 14, 18 and 22 are separated by equal recovery periods $\tau_R$. Preferably, recovery periods $\tau_R$ are determined based on the type of unit 36 used by display system 10. More specifically, recovery periods preferably correspond to an adjustment recovery time required by a pixel of unit 36 to change its color setting. Thus, as control unit 38 adjusts the setting of unit 36 such that a particular pixel selects a different proportion of RGB wavelengths contained in beam 30, $\tau_R$ corresponds to the adjustment recovery time required by that pixel to adjust to the new setting.

Display system 10 can use unit 36 with any suitable types of pixels. In FIG. 1 unit 36 acts as a single representative transmissive pixel, but reflective pixels can also be used. A person skilled in the art will recognize that the layout of system 10 will have to be altered correspondingly when projection beam 40 is reflected from unit 36 by reflective pixels.

Figure 3:
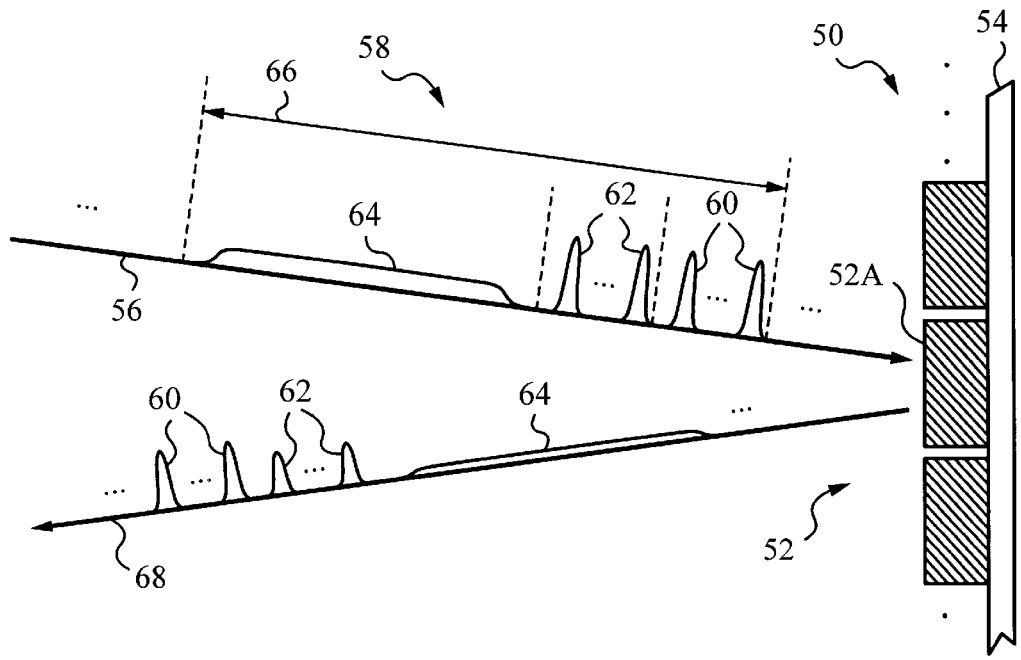
FIG. 3 is a diagram illustrating the illumination of a reflective pixel by a non-overlapping sequence of pulses according to the invention.

FIG. 3 illustrates a portion of an alternative image generation unit 50 with reflective pixels 52. Pixels 52 are individually addressable by a control unit 54. Control unit 54 sets a reflective property of pixels 52 such that each of them reflects the appropriate portion(s) of laser light in beam 56. For clarity, operation of only one pixel, 52A is illustrated in this drawing.

In this embodiment, beam 56 has a non-overlapping sequence of pulses 58 formatted differently than in beam 30. In particular, each cycle 66 contains a set of first pulses 60, a set of second pulses 62 and one semi-continuous pulse 64. The sets preferably contain equal numbers of pulses and are of equal duration, although this is not required. As before, first pulses 60 are at a green wavelength, second pulses 62 are at a blue wavelength and semi-continuous pulse 64 is at a red wavelength. The peak power of first pulses 60 and second pulses 62 is not as high as in the previous embodiment since several first pulses 60 and second pulses 62 are contained in cycle 66. The actual number of first and second pulses 60, 62 can vary, however, the average power in cycle 66 at each of the RGB wavelengths should still be in excess of 1 Watt. A person skilled in the art will appreciate that the order of the wavelengths and, indeed of pulses 60, 62 and 64 can be arbitrarily permuted if desired. Preferably, the duration of cycle 66 corresponds to a refresh rate of unit 50.

Pixel 52A reflects beam 56 in a projection beam 68. Specifically, pixel 52A reflects certain portions of light in beam 56 at green, blue and red wavelengths. In doing that, pulses 60, 62 and 64 are attenuated at rates dictated by control unit 54, thereby selecting the desired color to be generated by pixel 52A.

Figure 4:
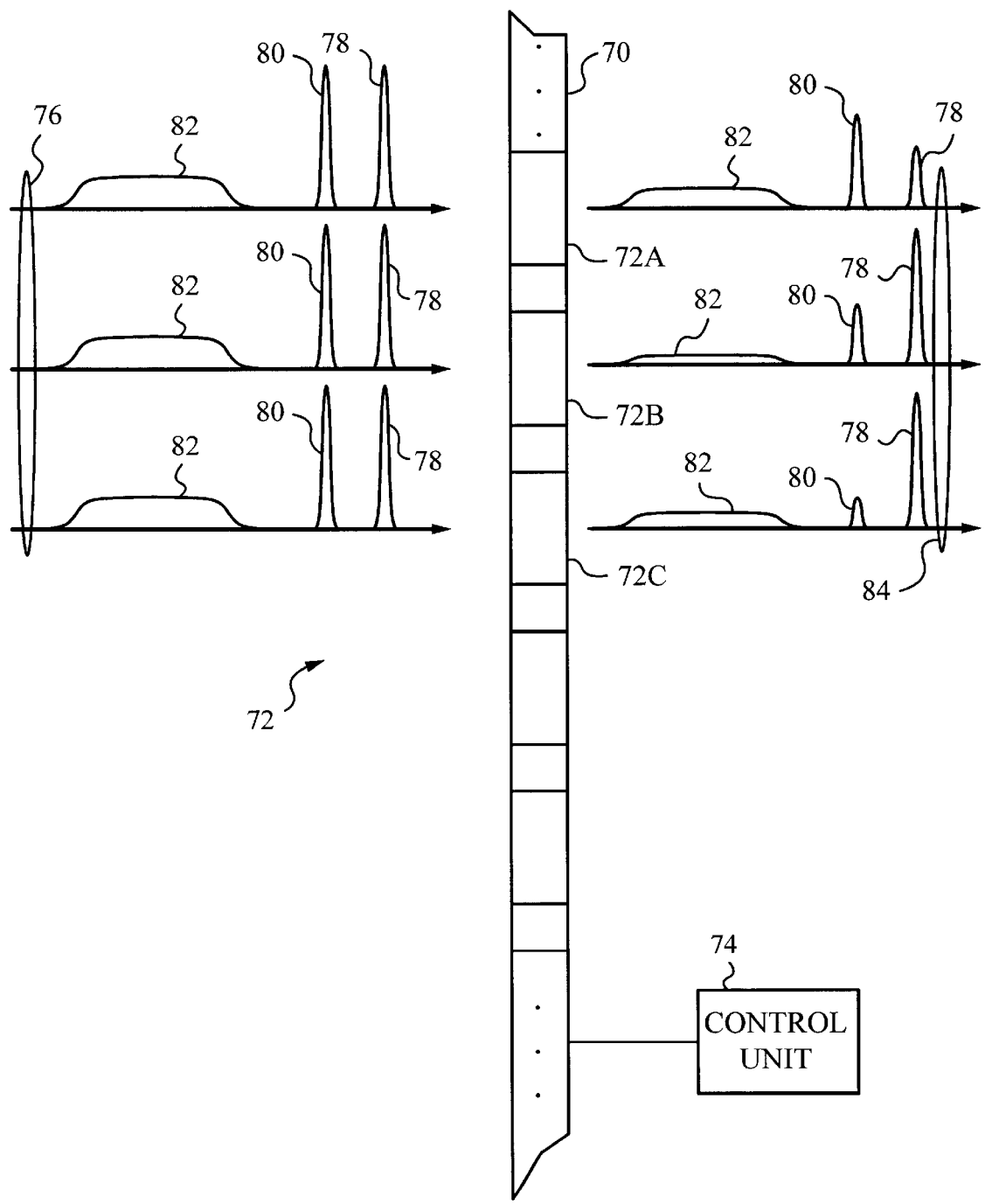
FIG. 4 is a diagram illustrating the illumination of transmissive pixels with the non-overlapping sequence of pulses according to the invention.

FIG. 4 illustrates a portion of yet another alternative image generation unit 70 with transmissive pixels 72. Pixels 72 are individually addressable by a control unit 74. Control unit 74 sets a transmissive property of pixels 72 to select the proper portion of light of a beam 76 containing the RGB wavelengths to be transmitted through pixels 72.

For better visualization, beam 76 carrying a non-overlapping sequence of first and second pulses 78, 80 and semi-continuous pulse 82 at the three RGB wavelengths is shown passing through three pixels 72A, 72B and 72C. The emerging projection beam 84 has the desired output color dictated by the amount of green, blue and red light which passes through pixels 72A, 72B and 72C.

In a preferred embodiment first and second sources 12, 16 are compound. Specifically, sources 12, 16 have passively Q-switched lasers for generating primary pulses, an amplifying fiber for receiving the primary pulses and amplifying them to generate high-power intermediate pulses, and a nonlinear element for receiving the intermediate pulses and generating first pulses 14 and second pulses 18. At least one of the first, second and third sources 12, 16 and 20 can be a diode laser. For example, the red wavelength is conveniently generated by using a diode laser as source 20.

Figure 5:
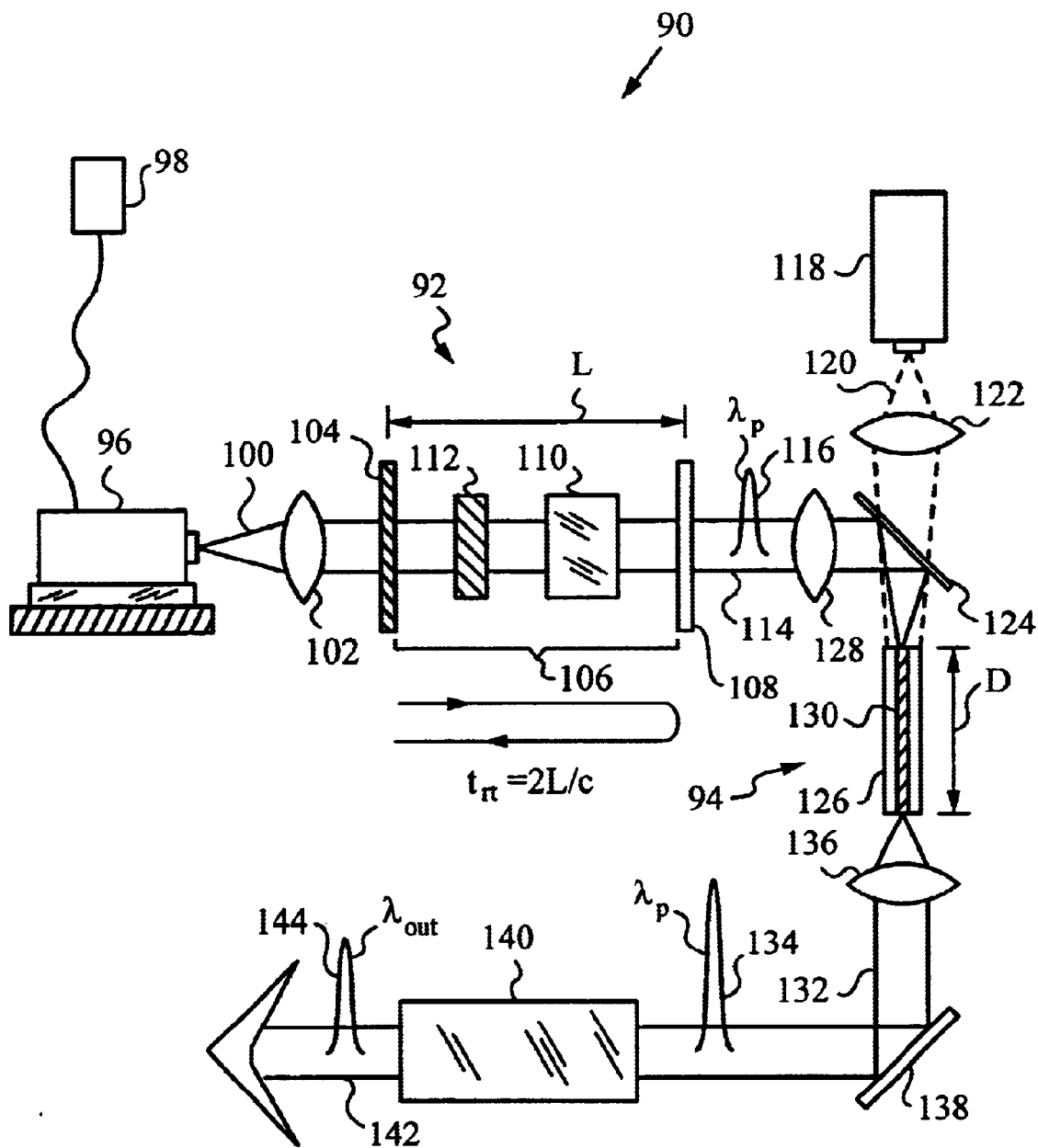
FIG. 5 illustrates a laser-based light source for generating laser light pulses.

FIG. 5 illustrates a light source 90 with a passively Q-switched laser 92 and a fiber amplifier 94 which is particularly convenient to use as source 12 and/or 16. Light source 90 has a pump source 96 for producing pump light 100. In this embodiment, pump source 96 is a laser equipped with a wavelength tuning mechanism 98. Laser 96 is designed to deliver pump light 100 in the form of a continuous wave (cw) light beam. Many types of lasers are suitable for use as pump source 96. For example, diode lasers emitting pump light 100 within the 750 nm to 1100 nm range can be used. The power level of these diode lasers can be between 100 mW and 4000 mW.

A lens 102 is provided before pump source 96 for focusing pump light 100 and directing it to an input coupler 104 of Q-switched laser 92. Input coupler 104 is designed to admit pump light 100 into a cavity 106 of passively Q-switched laser 92. Cavity 106 has a length L defined between input coupler 104 and an output coupler 108. Although in the present embodiment cavity 106 is linear and couplers 104, 108 are in the form of mirrors, a person skilled in the art will appreciate that other types of cavities and coupling elements can be used.

Cavity 106 contains a gain medium 110. Gain medium 110 exhibits a high amount of gain per unit length when pumped with pump light 100. Typically, high gain is achieved by providing a high doping level in gain medium 110 within the cross section traversed by light 100. Doped materials with suitable amounts of gain to be used as gain medium 110 include Yb:YAG at the 1030 nm and 980 nm transitions, Nd:Vanadate at the 880 nm, 914 nm, and 1064 nm transitions and Nd:YAG at the 946 nm and 1064 nm transitions. A person skilled in the art will be familiar with other suitable materials and the corresponding transitions. Some of these materials include Yb Glass Fiber (980 nm transition), Yb Glass Fiber (1020–1120 nm transition), Nd Glass Fiber (880–940 nm transition), and Nd Glass Fiber (1050–1090 nm transition).

Cavity 106 also contains a passive variable loss element or passive Q-switch 112. Preferably, passive Q-switch 112 is a saturable absorber Q-switch such as chromium:YAG, which functions in the wavelength range from 860 nm to 1100 nm. Alternatively, semiconductors or semiconductor material structured to act as a mirror can be used as passive Q-switch 112. Passive Q-switch 112 is adjusted for switching on and off such that, when subjected to cw pumping by pump light 100, passively Q-switched laser 92 generates a pulsed primary beam 114 at a primary wavelength $\lambda_p$. For clarity, only a single primary pulse 116 of primary beam 114 exiting cavity 106 through output coupler 108 is indicated in FIG. 1. Primary wavelength $\pi_p$ corresponds to the selected transition of gain medium 110. This transition can be selected in any suitable range. In the present case, the transitions are selected such that frequency doubling them generates the desired green and blue wavelengths, as described below.

Light source 90 also has a pump source 118 for supplying a pump light 120. Source 118 can be a diode laser operating in the wavelength range from 750 to 1000 nm and delivering between 1 and 100 Watts of power. Preferably, source 118 is a fiber coupled laser such as a LIMO type laser (available from LIMO Laser Systems, laser@limo.de). A lens 122 and a beam combiner 124 are positioned in the path of pump light 120. Lens 122 focuses pump light 120 such that it is in-coupled into fiber amplifier 124. In particular, with the aid of lens 122 pump light 120 is in-coupled into a cladding 126 of fiber amplifier 94. A lens 128 is also positioned in the path of primary beam 114 before beam combiner 124. Lens 128 focuses primary beam 114 such that after being combined with pump light 120 by beam combiner 124, primary beam 114 is in-coupled into a core 130 of fiber amplifier 124.

Fiber amplifier 94 produces a pulsed intermediate beam 132 at primary wavelength $\lambda_p$ from primary beam 114. Preferably, pulsed intermediate beam 132 exhibits high peak power, e.g., in the range of 10,000 Watts in each pulse 54 (only one pulse shown for reasons of clarity). To achieve such high peak power fiber amplifier 94 has a short length D, e.g., D is on the order of 2 meters, so as to suppress stimulated Raman scattering (SRS). In addition, to achieve efficient absorption of pump light 120 in core 130 over such short length D, cladding 126 is preferably small, e.g., between 100 μm and 200 μm in diameter. Furthermore, core 130 is preferably large, e.g., between 5 μm and 10 μm diameter, and exhibits a high doping level, e.g., 0.5% or more. A person skilled in the art will be able to select the appropriate dopant for doping core 130 to amplify primary beam 114 based on primary wavelength $\lambda_p$. Suitable doping ions when primary wavelength $\lambda_p$ is in the green range are Ytterbium ions while Neodymium ions can be used for amplifying primary beam 114 when its light is in the green or blue range. A person skilled in the art will also recognize that to obtain efficient amplification at wavelength $\lambda_p$ ranging between 960 and 980 nm it may be necessary to provide fiber amplifier 94 with suitable filtering characteristics (e.g., to suppress gain at the four level transition at 1064 nm).

Patent application Ser. No. 09/825,148 U.S. Pat. No. 6,563,995, entitled "Optical Wavelength Filtering Apparatus with Depressed-Index Claddings" and filed on Apr. 2, 2001 discusses suitable methods for achieving such filtering characteristics.

A lens 136 and a beam guiding element 138, in this case a mirror, are positioned in the path of pulsed intermediate beam 132. Lens 136 shapes pulsed intermediate beam 132 and element 132 deflects it such that beam 132 is in-coupled into a nonlinear element 140. Nonlinear element 140 is selected for its ability to frequency convert pulses 134 of pulsed intermediate beam 132 in a single pass to produce a pulsed output beam 142 at an output wavelength $\lambda_{out}$. Only one pulse 144 of output beam 144 is illustrated for clarity.

In the present embodiment, nonlinear element 140 consists of a single nonlinear optical crystal capable of converting primary wavelength $\lambda_p$ to output wavelength $\lambda_{out}$ in the green or blue range. The conversion process is second harmonic generation (SHG) and is well-known in the art. SHG doubles the frequency of intermediate beam 132, or, equivalently, halves primary wavelength $\lambda_p$ such that $2\lambda_{out}=\lambda_p$. Hence, when primary wavelength $\lambda_p$ is 920 nm then output wavelength $\lambda_{out}$ will be 460 nm; i.e., the desired blue wavelength $\lambda_{blue}$ for source 12. On the other hand, when primary wavelength $\lambda_p$ is 1064 nm then output wavelength $\lambda_{out}$ will be 532 nm yielding the desired $\lambda_{green}$ for source 16.

Preferably, optical crystal used as nonlinear element 140 is a borate crystal. In fact, preferably optical crystal is an LBO or BBO crystal. In addition, any appropriate phase matching technique known in the art is employed to ensure efficient SHG in nonlinear element 140.

During operation, pump source 96 is tuned by mechanism 98 to generate pump light 100 in the form of a cw beam at the requisite wavelength to pump gain medium 110. Passively Q-switched laser 92 is adjusted such that primary pulses 116 of output beam 114 are controlled. To achieve this, one notes that a round-trip time, $t_{rt}$, of cavity 96 is related to length L of cavity 96 by the equation:

$$t_{rt} = \frac{2L}{c},$$

where c is the speed of light. Hence, round-trip time $t_{rt}$ can be set by selecting length L of cavity 96. Meanwhile, passive Q-switch 112, in this case saturable absorber Q-switch is adjusted by setting its inter-pulse time. This is done by choosing the appropriate saturable loss, $q_0$, of the absorbing material and using the fact that the repetition rate of passive Q-switch 112 is proportional to pump power or the power level of pump light 100, and that increasing the repetition rate produces longer primary pulses 116. A person skilled in the art will know how to adjust these parameters to obtain the appropriate inter-pulse time and will also find additional teachings provided by G. J. Spuhler et al., "Experimentally Confirmed Design Guidelines for Passively Q-Switched Microchip Lasers Using Semiconductor Saturable Absorbers", J. Opt. Soc. Am. B, Vol. 16, No. 3, March 1999, pp. 376–388 and other sources.

In a preferred embodiment, length L is very short, e.g., L is on the order of 10 millimeters or less. Preferably, L is even less than 1 millimeter.

Primary pulses 116 exiting passively Q-switched laser 92 should preferably have a peak power level of at least 10 Watts and preferably between 50 and 500 Watts. When primary pulses 116 enter fiber amplifier 94, which has a gain of about 100 or more (e.g., between 50 and 500) they are amplified to form intermediate pulses 134 with over 1,000 Watts and preferably over 10,000 Watts of peak power while preserving primary pulse timing as described above. At this power level and timing, intermediate pulses 134 have a pulse format which is above a nominal nonlinear frequency conversion threshold for SHG in nonlinear element 140. Specifically, for the purposes of this description, nominal nonlinear frequency conversion threshold is defined to correspond to a pulse conversion efficiency of at least 10%. Preferably, the conversion efficiency is close to 50% or even higher. Now, at 10,000 Watts of peak power intermediate pulses 134 exhibit approximately 50% efficient conversion to output pulses 144 in LBO or BBO crystals of 20 mm length.

By operating light source 90 as described above it is possible to obtain output beam 144 with output pulses 144 at wavelengths 440 nm to 470 nm for blue light and 515 nm and 540 nm for green light at up to 5,000 Watts of peak power with a duty cycle between 0.01% and 1%. As discussed above, this is within the pulse format desired for blue and green wavelengths.

Alternatively, source 90 can employ optical parametric generation (OPG) or another type of nonlinear frequency conversion operation such as difference frequency generation (DFG) to derive the output wavelength. In fact, even cascaded frequency conversion processes can be employed. OPG is an attractive alternative to SHG because it is a highly-efficient, single-pass and single input wavelength process (the requisite idler and signal beams are usually obtained by vacuum amplification). In addition, the output spectrum of output beam 144 is somewhat broadened (typically by a few nm) when OPG is used, making it suitable for display system 10, since broadened spectra eliminate speckle effects.

Figure 6:
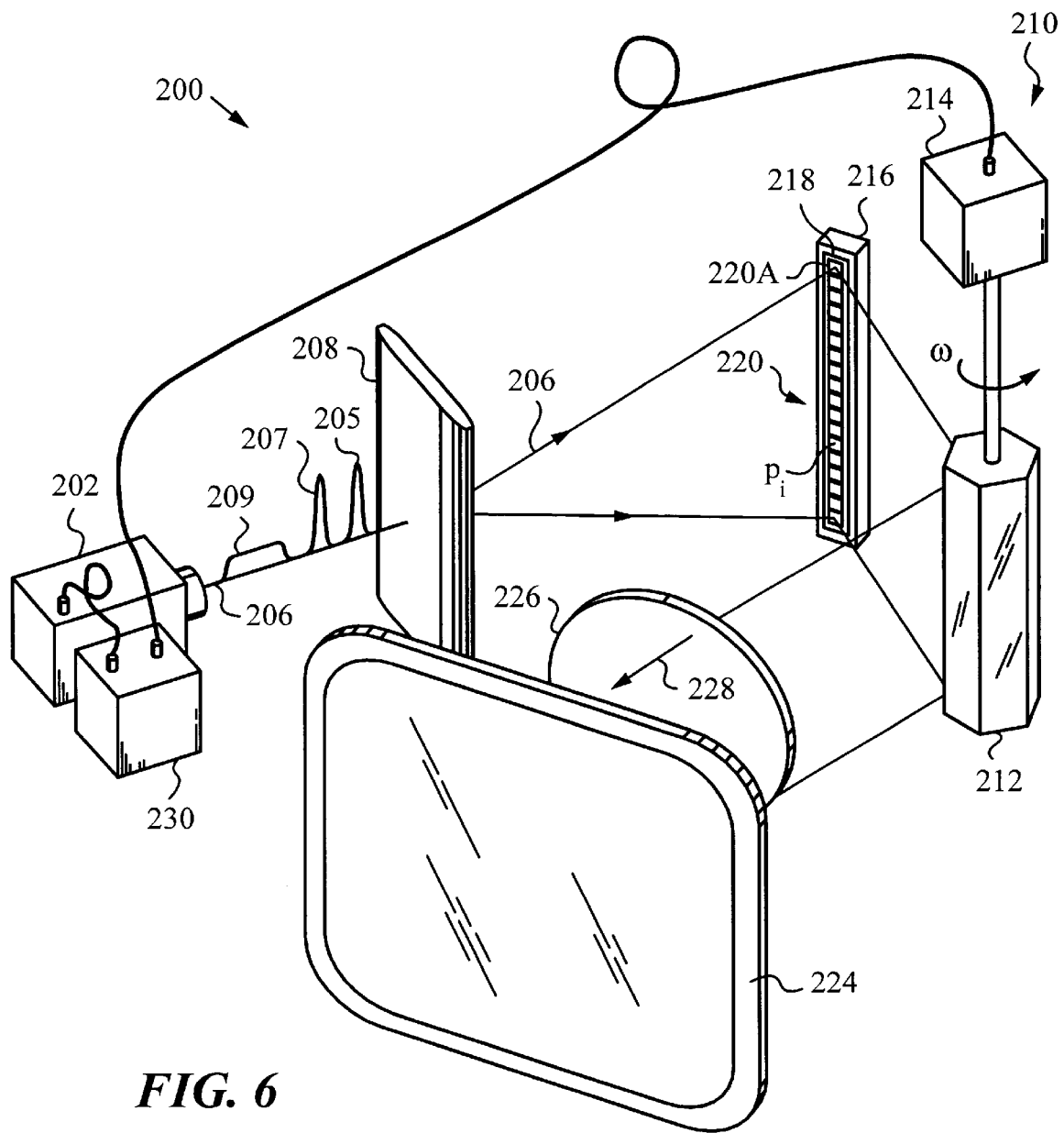
FIG. 6 is an isometric view of a line scanned display system.

FIG. 6 illustrates an image display system 200 employing a projection light source 202. In this case image display system 200 is a scanned linear image display system.

Projection light source 202 has a first and a second light source (not shown in this figure) for producing first pulses 205 at a green wavelength and second pulses 207 at a blue wavelength. Projection light source 202 also has a third light source (not shown in this figure) for producing semi-continuous pulses 209 at a red wavelength. The output of the three light sources is combined by projection light source 202 and exits in the form of beam 206 with a non-overlapping sequence of pulses 205, 207, 209. The pulse format of pulses 205, 207, 209 is selected such that an average power of 2.5 Watts is delivered at each wavelength.

Image projection system 200 has cylindrical beam shaping and guiding optics 208, generally indicated by a cylindrical lens. Of course, guiding optics 208 will typically include a number of lenses and other elements, as will be appreciated by a person skilled in the art. Optics 208 are adapted for line-wise image scanning by expanding output beam 206 along the vertical direction.

An image generator 216 having a vertical line 218 of pixels $p_i$ is positioned in the path of expanded output beam 206. Image generator 216 can be any suitable unit capable of generating images line-by-line and requiring illumination by red, green and blue wavelengths, as provided in output beam 206. In the present embodiment image generator 216 is a grating light valve array made up of vertical line 218 of independently controlled grating-type light valves 220. Each one of light valves 220 corresponds to a pixel.

Figure 7:
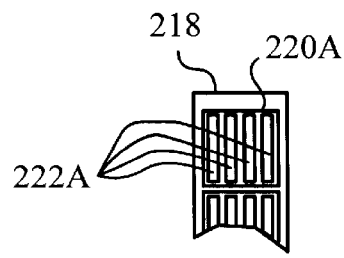
FIG. 7 is a detailed view of a grating-type light valve used in the display system of FIG. 7.

FIG. 7 illustrates a light valve 220A having adjustable grating strips 222A. Strips 222A are moved by a suitable mechanism to adjust the grating of light valve 220A to diffract a particular color into a projection beam 228. The principles of operation and design of grating-type light valves are known and the reader is referred for further information to David T. Amm et al., "Optical Performance of the Grating Light Valve Technology", presented at Photonics West—Electronic Imaging 1999, Projection Displays.

A linear scanner 210 having a rotating deflection unit 212 and a control 214 is provided for line-wise scanning of projection beam 228. The scanning speed is controlled by control unit 214 which adjusts the angular speed of rotation $\omega$ of deflecting unit 212. A person skilled in the art will recognize that other types of optics and scanning devices can be used, depending on the method of image scanning.

The scanned image produced by image generator 216 is projected on a display screen 224 with the aid of optics 226, generally indicated by a lens. In particular, light valves 220, are set to diffract the RGB wavelengths provided in beam 206 to generate an image linewise in the diffracted projection beam 228. Beam 228 is projected by optics 226 on screen 224 to display the image to a viewer.

Although it is possible to dedicate certain light valves 220 to each color, it is preferable to employ time-multiplexing to cause valves 220 to diffract different colors at different times. The switching speed of valves 220 is sufficiently high to support time-multiplexing. This approach takes full advantage of the pulse sequencing method of the invention and is highly efficient in its use of resources. In particular, with time-multiplexing image projection system 200 makes efficient use of the least number of light valves 220 since it does not require any color-dedicated valves 220.

A synchronizing mechanism 230 is connected to projection light source 202 and to control 214 of linear scanner 210. Mechanism 230 is provided to coordinate the timing of pulses 205, 207, 209 in output beam 206 with the line scanning performed by linear scanner 210.

When operating image display system 200 projection light source 202 is set to deliver a non-overlapping sequence of pulses 205, 207, 209 at the green wavelength from light source one, at the blue wavelength from light source two, and at the red wavelength from light source three. The sequence of pulses 205, 207, 209 is repeated at a certain cycle rate. Projection light source 202 is set to deliver a number of cycles during a refresh time which is the time allotted by control 214 of linear scanner 210 to generate each line of the image. Preferably, the number of cycles during the refresh time should be an integer multiple of the refresh rate.

The number of cycles is dictated by the angular velocity $\omega$ of rotating deflection unit 212. Synchronizing mechanism 230 adjusts the timing of output pulses 205, 207, 209 in coordination with angular velocity $\omega$ of unit 212 such that an equal integer number of cycles 232 is delivered during each refresh time. Refresh time is dictated, among other, by the perception parameters of the human eye. Pixels $p_i$ in each line 218 have to be refreshed rapidly enough for the human eye not to notice any appreciable image discontinuities. This condition determines the length of refresh time given the number of lines of which the scanned image is composed.

In display systems with a large number of lines, e.g., on the order of 1,000 to 2,000 the appropriate refresh rate requires that passively Q-switched laser for the first and second light sources (green and blue) be set at a primary pulse repetition rate of at least 100 kHz.

A person skilled in the art will appreciate that the pulse sequencing method of the invention can be employed in display systems which are not scanned line-by-line but employ some different scanning procedure. Also, the method can also be used in display systems using as image generating pixels liquid crystals or micro-mirror arrays. In still another embodiment, the image generation unit can be a two-dimensional array of pixels generating an image in a non-scanned image display system. A person skilled in the art will appreciate that various multiplexing and scanning methods can be employed to operate such scanned and non-scanned display systems.

Although the present invention and its advantages have been described in detail, it should be understood that various changes, substitutions, and alterations can be made herein without departing from the principle and the scope of the invention. Accordingly, the scope of the present invention should be determined by the following claims and their legal equivalents.

What is claimed is:

1. A method of sequencing pulses of laser light for color generation, said method comprising:
   a) providing first pulses at a green wavelength;
   b) providing second pulses at a blue wavelength;
   c) providing semi-continuous pulses at a red wavelength;
   d) producing a non-overlapping sequence of said first pulses, said second pulses and said semi-continuous pulses;
   e) illuminating a color generating unit with said non-overlapping sequence; and
   f) adjusting said color generating unit to select a portion of said laser light at at least one of said green wavelength, said blue wavelength and said red wavelength.

2. The method of claim 1, wherein said color generating unit is an image generating unit.

3. The method of claim 2, wherein said image generating unit is a pixel and said step of adjusting said image generating unit comprises setting a reflecting property of said pixel.

4. The method of claim 2, wherein said image generating unit is a pixel and said step of adjusting said image generating unit comprises setting a transmissive property of said pixel.

5. The method of claim 1, further comprising adding a recovery periods between said first pulses, said second pulses and said semi-continuous pulses of said non-overlapping sequence.

6. The method of claim 5, wherein said color generating unit is a pixel and said recovery period corresponds to an adjustment recovery time of said pixel.

7. The method of claim 6, wherein said pixel is a grating-type light valve.

8. The method of claim 1, wherein said first pulses and said second pulses have a narrow pulse width and an interpulse separation of at least 100 times said narrow pulse width.

9. The method of claim 8, wherein said semi-continuous pulses have a wide pulse width equal to at least 100 times said narrow pulse width.

10. The method of claim 1, wherein said first pulses, said second pulses and said semi-continuous pulses have essentially equal time-averaged power.

11. The method of claim 1, wherein said first pulses, said second pulses and said semi-continuous pulses have balanced powers such that their mixture produces white light.

12. The method of claim 1, wherein said non-overlapping sequence comprises a set of said first pulses, a set of said second pulses and one said semi-continuous pulse.

13. The method of claim 12, wherein said set of said first pulses, said set of said second pulses are of equal duration.

14. The method of claim 12, wherein one cycle of said set of said first pulses, said second of said second pulses and one said semi-continuous pulse corresponds to a refresh rate of said color generating unit.

15. The method of claim 1, wherein one cycle of said non-overlapping sequence corresponds to a refresh rate of said color generating unit.

16. The method of claim 1, for use in a scanning display system.

17. A display system comprising:
   a) a first source of first pulses at a green wavelength;
   b) a second source of second pulses at a blue wavelength;
   c) a third source of semi-continuous pulses at a red wavelength;
   d) a coordinating means for producing a non-overlapping sequence of said first pulses, said second pulses and said semi-continuous pulses;
   e) an image generation unit for illuminating with said non-overlapping sequence; and
   f) a control means for adjusting said image generating unit to select a portion of light at at least one of said green wavelength, said blue wavelength and said red wavelength.

18. The display system of claim 17, wherein at least one of said first source and said second source comprises:
   a) a passively Q-switched laser for generating primary pulses;
   b) an amplifying fiber for receiving said primary pulses and generating high-power intermediate pulses; and
   c) a nonlinear element for receiving said intermediate pulses and generating at least one of said first pulses and said second pulses.

19. The display system of claim 17, wherein said image generation unit comprises pixels.

20. The display system of claim 19, wherein said pixels comprise grating-type light valves.

21. The display system of claim 17, wherein at least one of said first source, said second source and said third source comprises a diode laser.

* * * * *

UNITED STATES PATENT AND TRADEMARK OFFICE
CERTIFICATE OF CORRECTION

PATENT NO.   : 6,753,931 B2
DATED        : June 22, 2004
INVENTOR(S)  : Thomas James Kane et al.

It is certified that error appears in the above-identified patent and that said Letters Patent is hereby corrected as shown below:

Column 1,
Line 13, please insert the following paragraph before FIELD OF THE INVENTION
-- STATEMENT REGARDING FEDERALLY SPONSORED RESEARCH OR DEVELOPMENT This invention was made with Government support under contract number F29601-99-C-0136 awarded by AFRL.

The government has certain rights in the invention. --

Signed and Sealed this

First Day of February, 2005

JON W. DUDAS
*Director of the United States Patent and Trademark Office*